US012583394B2

(12) United States Patent
Jovanovic

(10) Patent No.: US 12,583,394 B2
(45) Date of Patent: Mar. 24, 2026

(54) MULTI-USE STORAGE CONTAINER HAVING A HINGED DOOR

(71) Applicant: Marko Jovanovic, River Forest, IL (US)

(72) Inventor: Marko Jovanovic, River Forest, IL (US)

( * ) Notice: Subject to any disclaimer, the term of this patent is extended or adjusted under 35 U.S.C. 154(b) by 252 days.

(21) Appl. No.: 18/278,606

(22) PCT Filed: Mar. 7, 2022

(86) PCT No.: PCT/US2022/019198

§ 371 (c)(1),
(2) Date: Aug. 23, 2023

(87) PCT Pub. No.: WO2022/192159

PCT Pub. Date: Sep. 15, 2022

(65) Prior Publication Data

US 2024/0131995 A1 Apr. 25, 2024
US 2024/0227686 A9 Jul. 11, 2024

Related U.S. Application Data

(60) Provisional application No. 63/158,809, filed on Mar. 9, 2021.

(51) Int. Cl.
B60R 9/055 (2006.01)
B60P 3/38 (2006.01)
B63B 34/23 (2020.01)

(52) U.S. Cl.
CPC ................ B60R 9/055 (2013.01); B60P 3/38 (2013.01); B63B 34/23 (2020.02)

(58) Field of Classification Search
CPC ... B60R 9/055; B60R 9/00; B60P 3/38; B60P 3/39
See application file for complete search history.

(56) References Cited

U.S. PATENT DOCUMENTS 3,685,061 A * 8/1972 Wray ........................ B60P 3/38
52/63
3,713,687 A 1/1973 Hooks et al.
4,366,979 A * 1/1983 Pillot ........................ B60P 3/38
296/160

(Continued)

FOREIGN PATENT DOCUMENTS

KR 102153977 B1 9/2020

OTHER PUBLICATIONS

International Search Report and Written Opinion for Application No. PCT/US2022/019198, mailed on Jun. 14, 2022, 8 Pages.

*Primary Examiner* — Derek J Battisti
(74) *Attorney, Agent, or Firm* — DLA PIPER LLP (US); Blake W. Jackson; Thomas J. Fuller

(57) ABSTRACT

Disclosed herein is a multi-purpose storage container having various configurations. For example, multi-purpose storage container may be transformed to a cargo box, portable storage unit, tent or other shelter, sled, boat, and the like by configuring one or more components. The multi-purpose storage container may be mounted to a vehicle. Once mounted, the interior of the multi-purpose storage container may be accessed from inside the vehicle through a moveable section of the platform that aligns with a sunroof of the vehicle.

13 Claims, 13 Drawing Sheets

(56)                     References Cited

U.S. PATENT DOCUMENTS

| | | | |
|---|---|---|---|
| 5,544,671 A * | 8/1996 | Phillips .................. | B60P 3/341 |
| | | | 135/88.14 |
| 11,560,732 B2 * | 1/2023 | Montesalvo .............. | B60P 3/38 |
| 11,660,997 B2 * | 5/2023 | Davis ...................... | B60P 3/341 |
| | | | 296/173 |
| D1,019,866 S * | 3/2024 | Cheng .......................... | D21/834 |
| 2022/0243495 A1 * | 8/2022 | Davis, Jr. .............. | E04H 15/008 |

* cited by examiner

MULTI-USE STORAGE CONTAINER HAVING A HINGED DOOR

CROSS REFERENCE

This application relates to and claims priority from U.S. Provisional 63/158,809 filed 9 Mar. 2021, the entirety of which is hereby incorporated by reference.

TECHNICAL FIELD

This application relates to the field of storage containers. More specifically, this application relates to a multi-purpose storage container that may be used as a temporary shelter, portable storage unit, cargo box, sled, boat, and the like.

BACKGROUND

As more people move to cities and crowded suburbs, storage space is becoming more desirable. Dedicated, temporary storage facilities are expensive and often located a far away from a person's home or apartment. The most common solution for expanding onsite storage is a temporary storage unit or cargo box. Both of these solutions, however, have ample problems. Cargo boxes are bulky structures that have the sole purpose of carrying cargo. Additionally, cargo boxes are typically stationary and have a removable lid to allow cargo to be placed inside and removed from the box. Temporary storage units are not weatherproof and therefore cannot be relied on to store objects for extended periods of time. Therefore, cargo boxes are most commonly used to temporarily expand the amount of cargo space in a car, truck, or other vehicle. For example, cargo boxes may be mounted to a roof rack or placed inside a truck bed to provide additional covered storage for vehicles. Cargo boxes have one dedicated use so once the boxes are no longer needed for storage, the boxes typically sit empty.

Most cargo boxes are heavy and bulky, therefore, they are difficult to transport and difficult to attach and detach from vehicles. Two or more people are typically required to move or mount even an empty cargo box. The difficulty of mounting and removing cargo boxes and the limited uses of current temporary storage units discourage people from using these solutions to provide the extra storage space they need. As a result, people may not have the objects they need handy and items that are left uncovered by be damaged or destroyed. The difficulty of mounting and removing typical cargo boxes also increases the amount of time required to perform tasks that use extra storage space such as packing for a vacation or moving to a new house.

Therefore, there is a need for a multi-purpose storage container than can be easily mounted to a vehicle and or used as a stand-alone storage facility. It is desirable that the storage container transform into other devices that have uses that are distinct from storing cargo. The storage container should also have features that make moving and mounting the storage container easier for one person. These features would encourage use and make it easier for people to obtain additional storage space.

SUMMARY

In one aspect disclosed herein are multi-purpose storage containers comprising a platform including two raised panels and a movable section cut into the platform, wherein the movable section is fixed to the platform using one or more hinges and each of the two raised panels runs along a side of the platform between a front end of the platform and a rear end of the platform; a shell attached to the platform at a hinge joint positioned at the front end of the platform, the shell configured to rotate along the hinge joint; and a liner including a top edge removably attached to the shell and a bottom edge removably attached to the platform, the liner configured to unfold to form two side walls that extend between the shell and the platform when the shell is rotated above the platform.

In one aspect, the multi-purpose storage containers further comprise a track that forms a perimeter of the shell and a groove cut into a gap on each side of the platform, wherein the gap is formed between a side edge of the platform and the raised panel, wherein the track is configured to fit inside the groove when the shell is closed over the platform.

In one aspect, the multi-purpose storage container includes one or more wheels positioned at a rear end of the shell, wherein the front end of shell includes a handle configured to allow the front end of the shell and the front end of the platform to be lifted off of the ground so that the multi-purpose storage container can roll on the one or more wheels.

In one aspect, the track includes a clip positioned at each side of the shell and the two raised panels each include a hook at the rear end of the platform, the hook configured to receive the clip to secure the shell to the platform. In one aspect, the shell is configured to rotate along the hinged joint to from a closed configuration of the multi-purpose storage container and an open configuration of the multi-purpose storage container. In one aspect, a bottom edge of the shell is flush against a floor of the platform when the multi-purpose storage container is in the closed configuration.

In one aspect, the shell is rotated above the platform so that a bottom edge of the shell forms an angle of up to seventy degrees relative to a floor of the platform when the multi-purpose container is in the open configuration. In one aspect, rotating the shell above the platform to arrange the multi-purpose storage container in the open configuration creates an opening at the rear end of the platform, wherein an interior of the multi-purpose storage container may be accessed through the opening.

In one aspect, the multi-purpose storage containers further comprise a door configured to cover the opening, wherein the door comprises a frame that extends beyond the rear end of the shell and a curtain attached to the frame, the door configured to cover the opening by rotating down over the opening via a pivot. In one aspect, the multi-purpose storage containers further comprise an extension rod fixed to the platform and the shell, wherein the extension rod extends between the shell and the platform to support the shell when the shell is rotated above the platform.

In one aspect, the shell is configured to be detached from the platform and inverted so that a closed top of the shell is in contact with the ground to allow cargo to be placed in an interior of the shell; the shell includes a raised board that forms a seat to transport a person inside the shell when the shell is inverted; and wherein the shell includes two side walls, a front wall, and a rear wall, that are configured to form at least one of a sled or a hull of a boat when the shell is inverted. In one aspect, the two side walls slope inwardly from the top edge of the inverted shell to the bottom edge of the inverted shell.

In one aspect, the multi-purpose storage container is configured to be mounted to a roof rack of a vehicle by attaching the platform to the roof rack. In one aspect, the movable section is aligned with a sunroof of the vehicle so that an interior of the multi-purpose storage container may be accessed from inside the vehicle through the sunroof by rotating the movable section into the interior of the multi-purpose storage container.

In one aspect, the platform includes a cord attached to the movable section, wherein the cord is configured to support the movable section when the movable section is rotated away from the platform.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Multi-Purpose Storage Container Hardware Overview

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known components have not been described in detail so as not to unnecessarily obscure aspects of the embodiments of the invention. Several embodiments of the invention are disclosed herein. Each embodiment includes several features and these features could be combined with any of the other features of the other embodiments disclosed herein in any combination or permutation"

Figure 1:
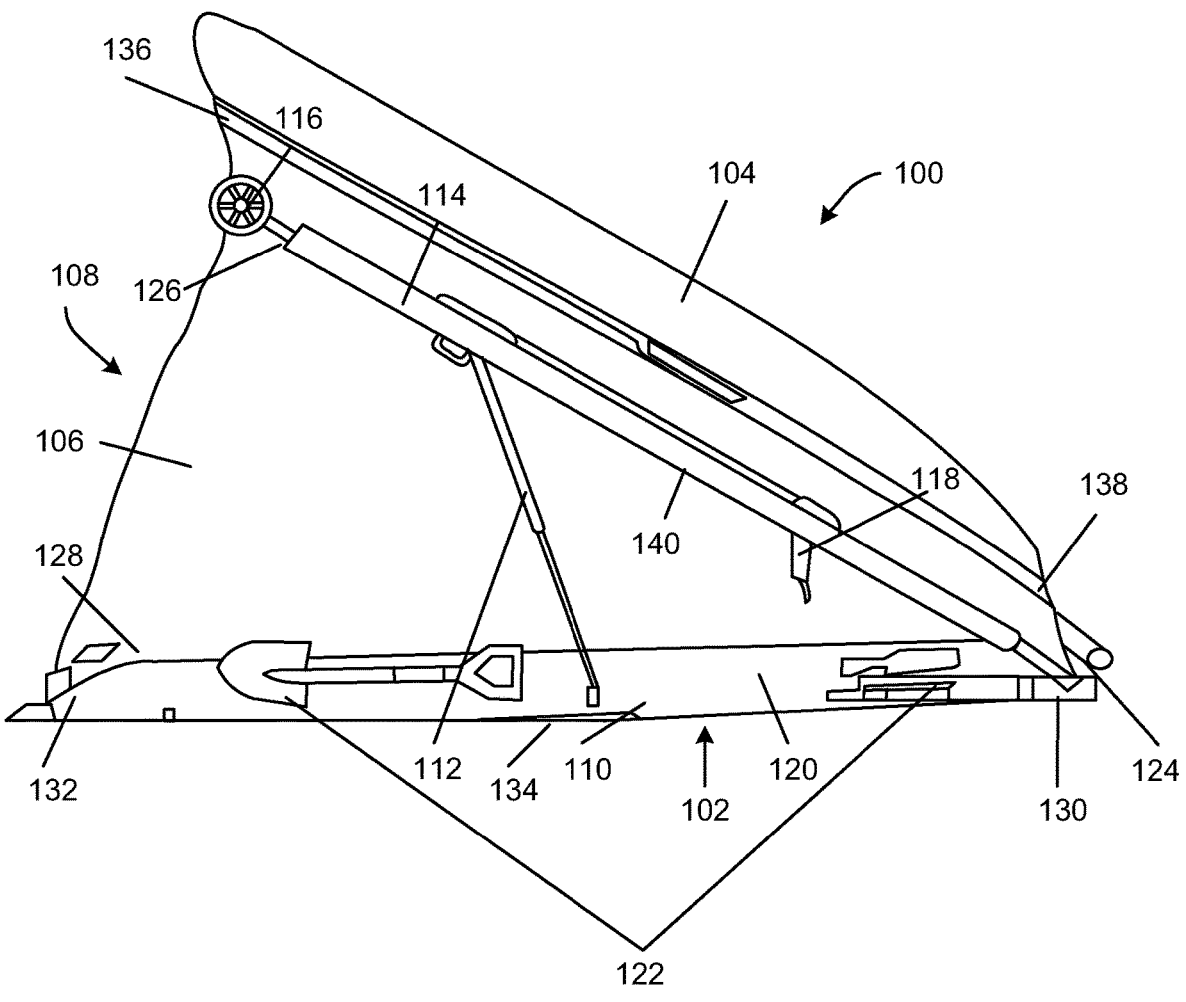
FIG. 1 is a side view of an open configuration of an exemplary multi-purpose storage container, according to embodiments of the disclosure.
Figure 2:
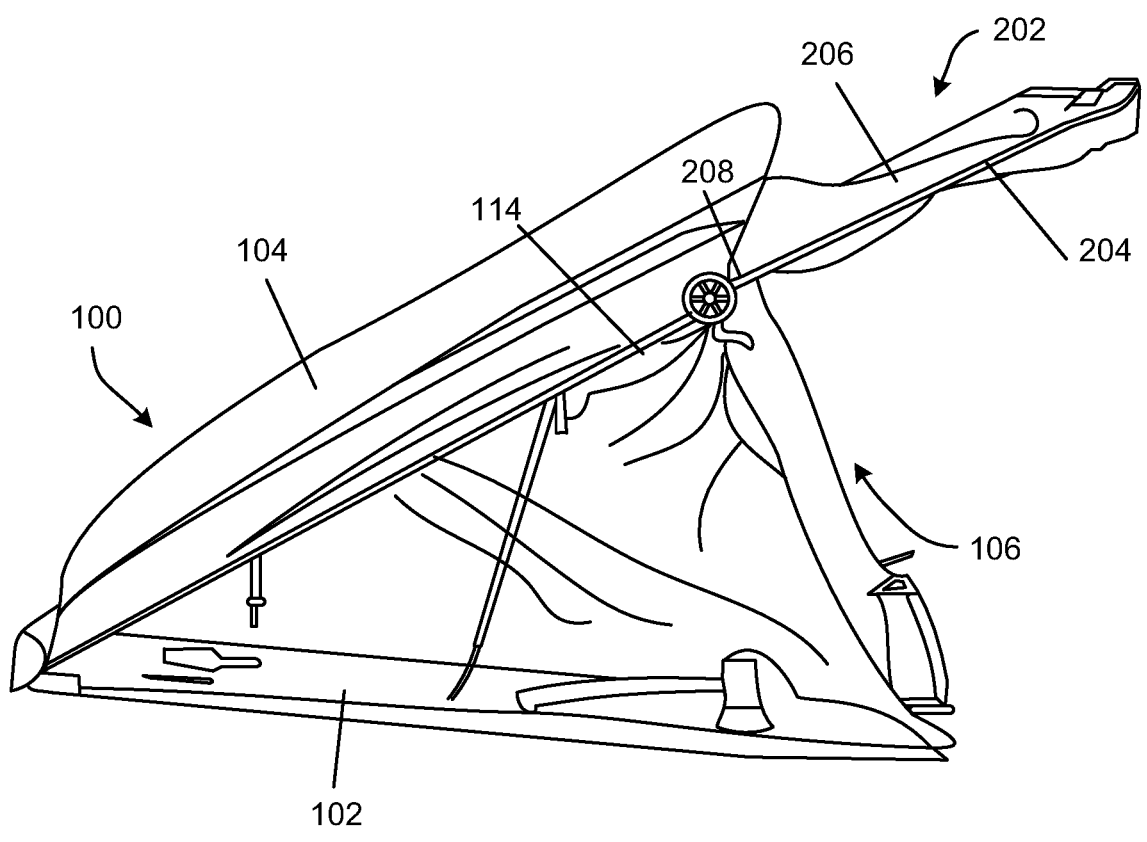
FIG. 2 is an alternate side view of an open configuration of an exemplary multi-purpose storage container, according to embodiments of the disclosure.
Figure 3:
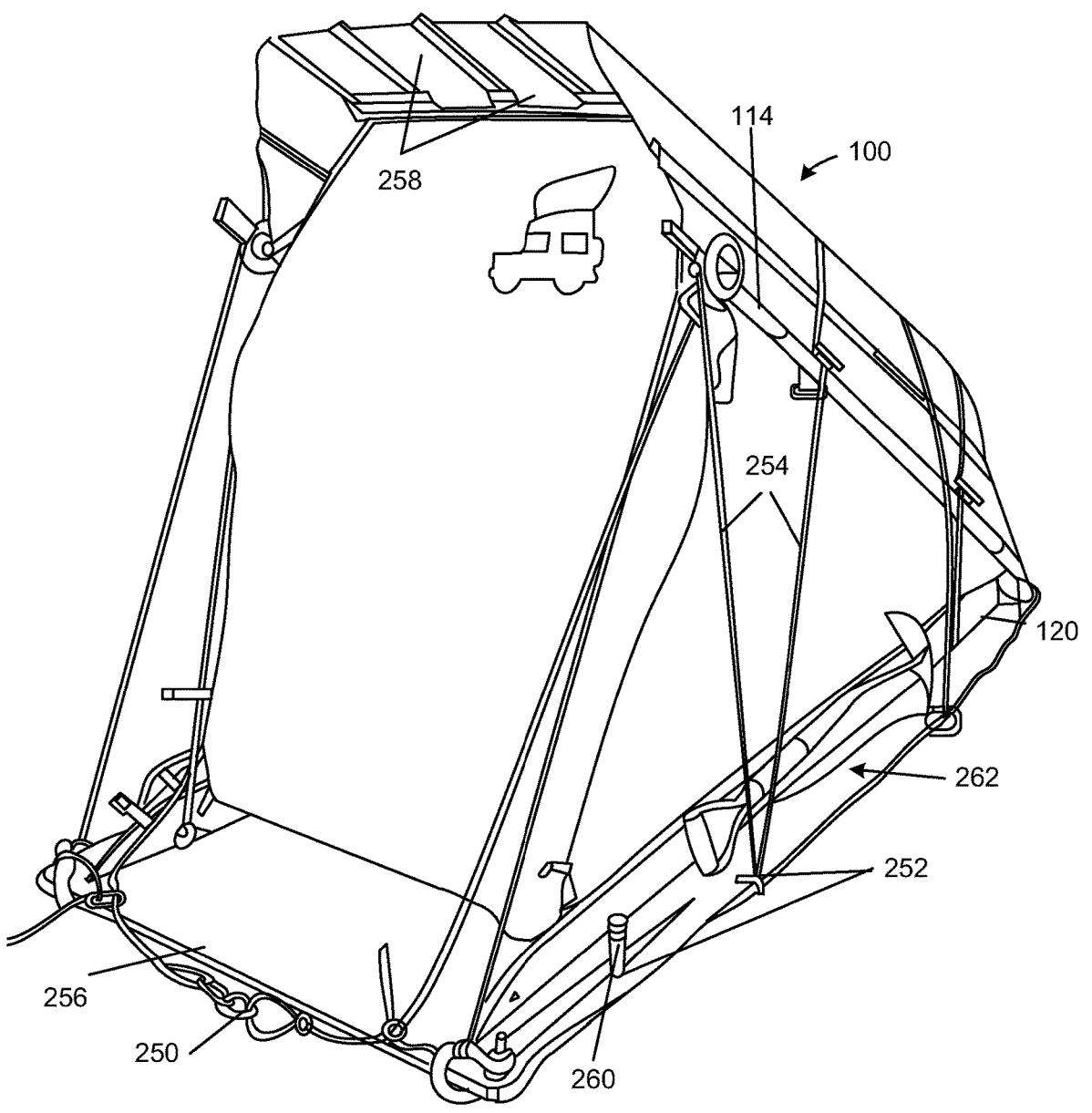
FIG. 3 is a rear view of an open configuration of an exemplary multi-purpose storage container, according to embodiments of the disclosure.
Figure 4:
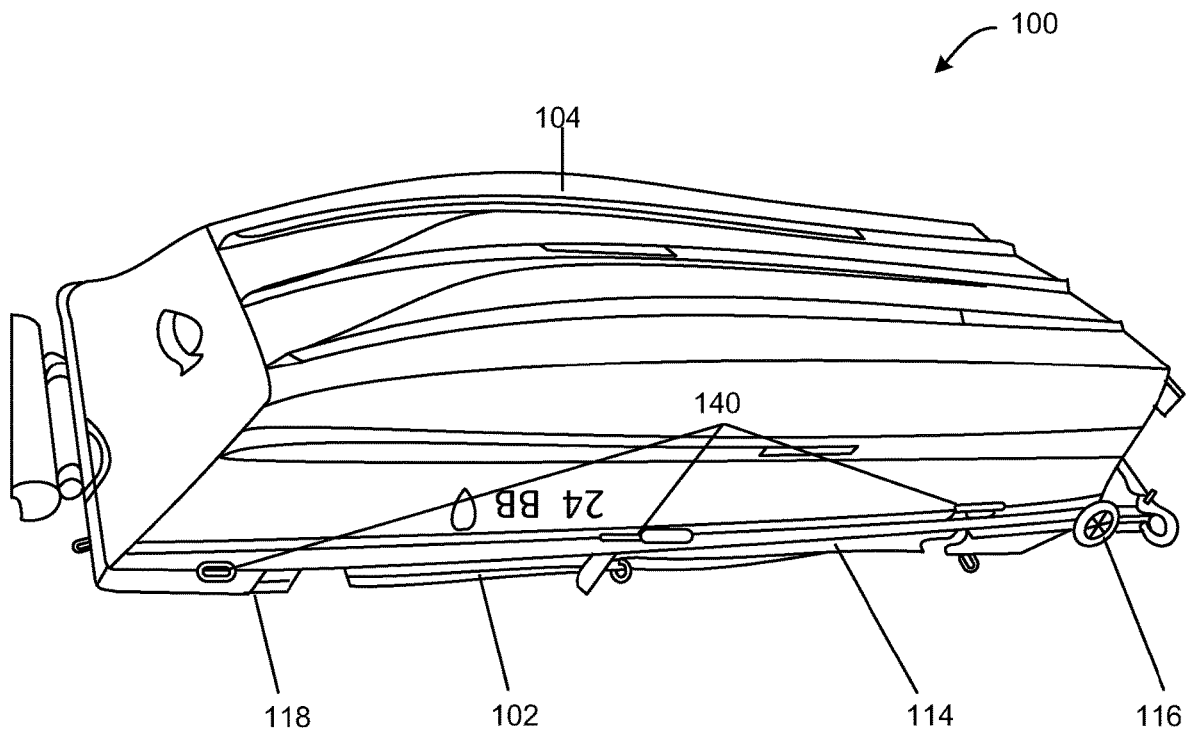
FIG. 4 is a side view of a closed configuration of an exemplary multi-purpose storage container, according to embodiments of the disclosure.
Figure 5:
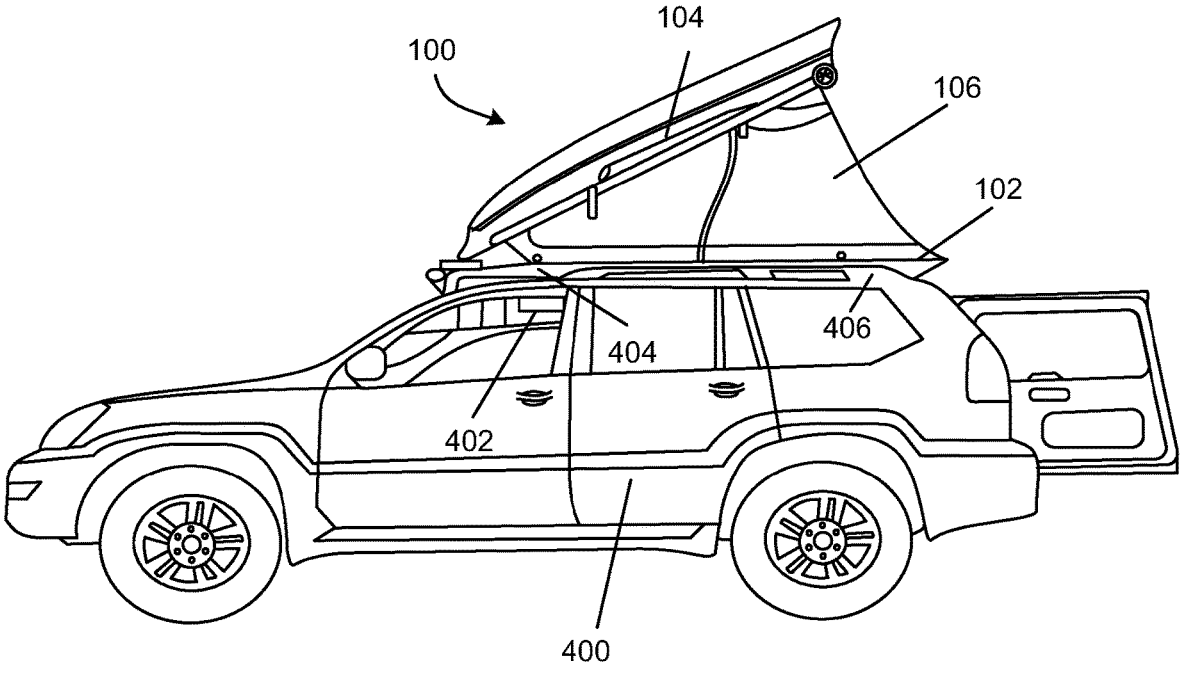
FIG. 5 is a side view of an exemplary multi-purpose storage container mounted to an automobile, according to embodiments of the disclosure.
Figure 6:
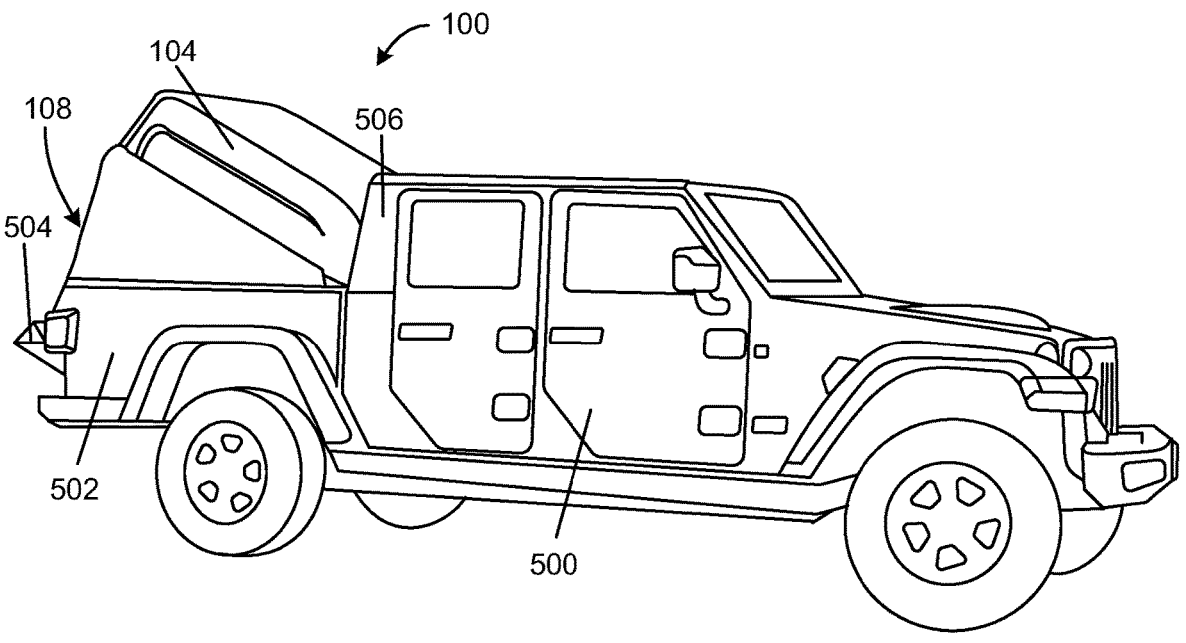
FIG. 6 is a side view of an exemplary multi-purpose storage container alternatively mounted to an automobile, according to embodiments of the disclosure.
Figure 7:
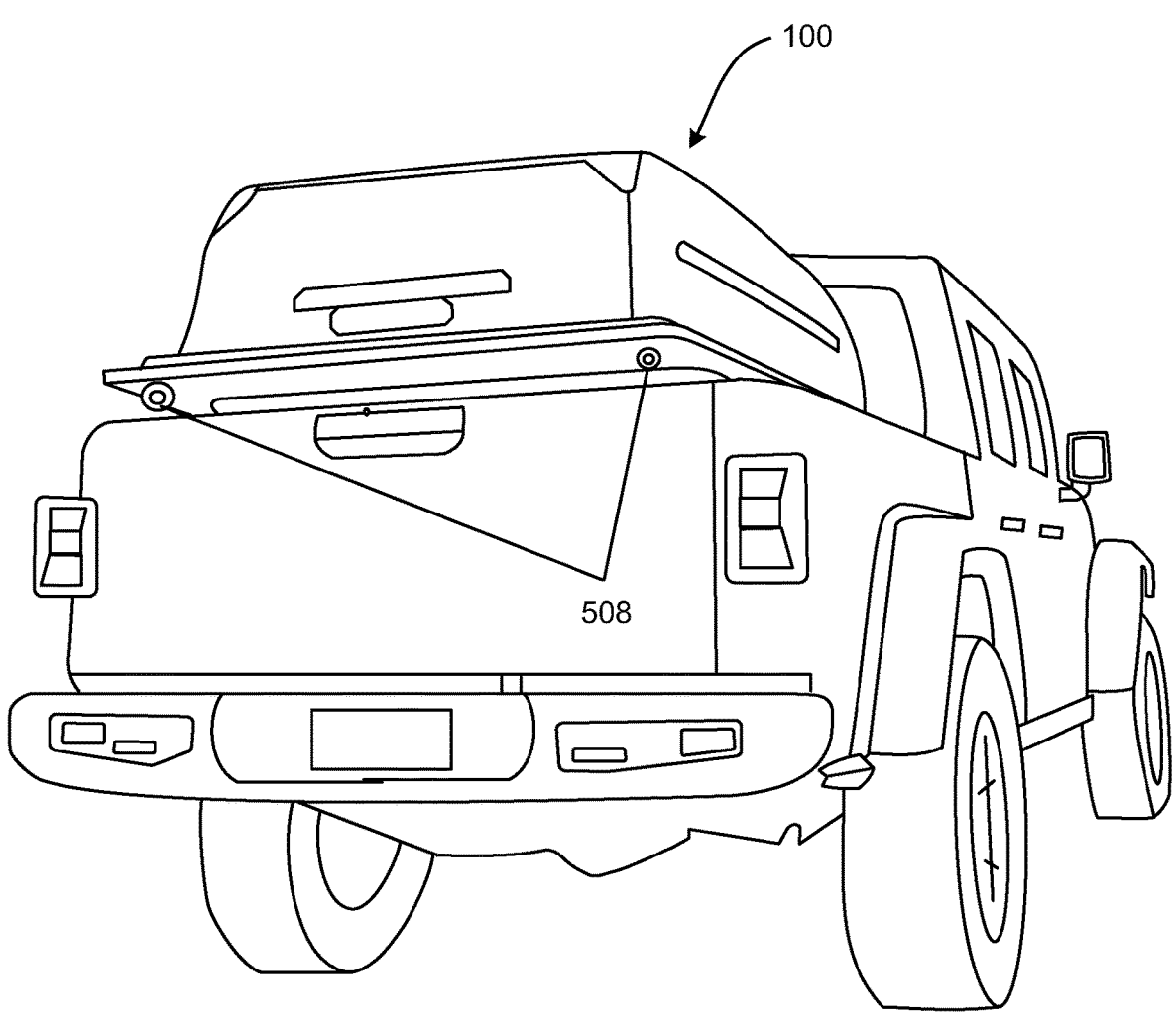
FIG. 7 is a rear view of a closed configuration of an exemplary multi-purpose storage container alternatively mounted to an automobile, according to embodiments of the disclosure.
Figure 8:
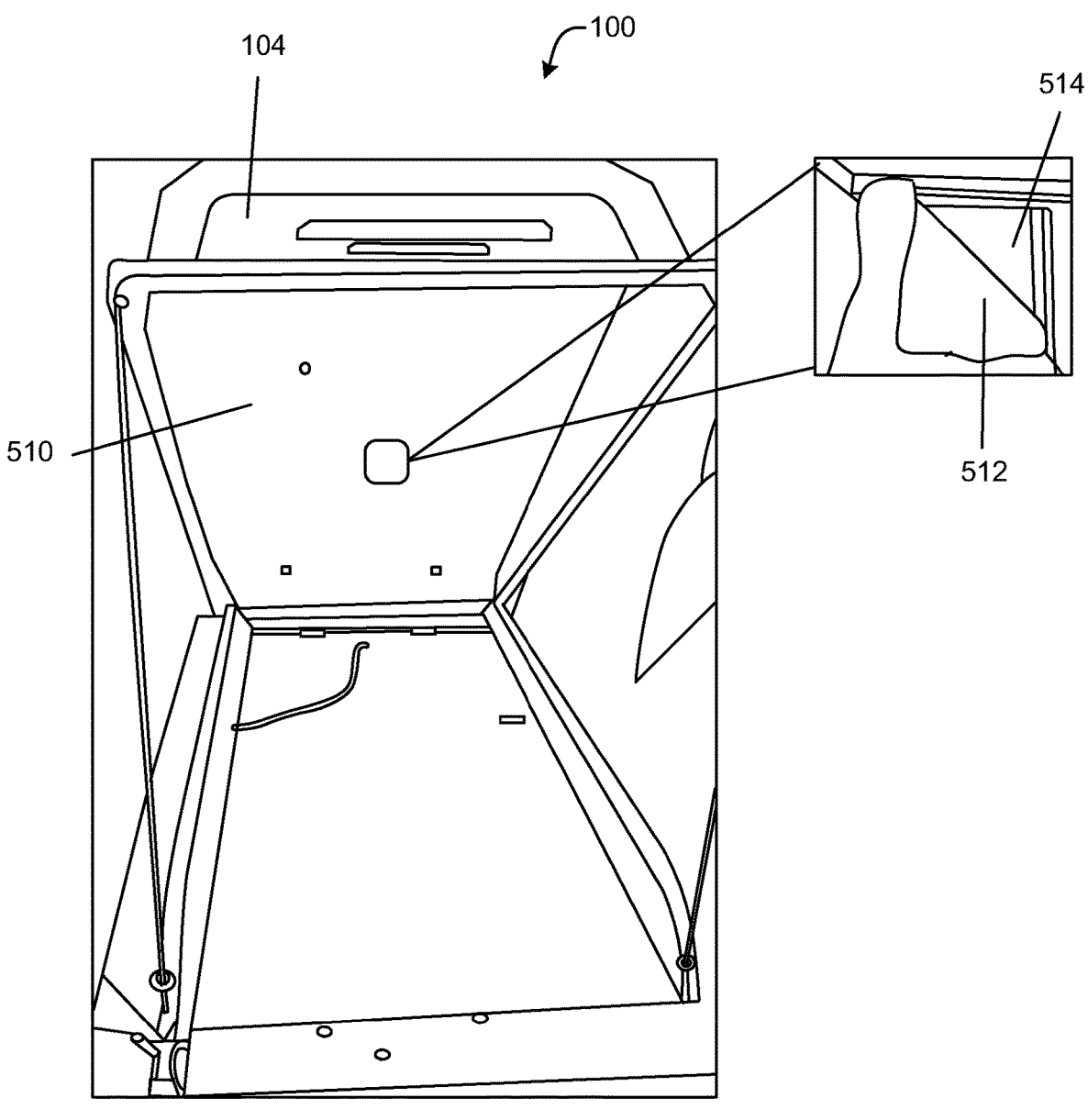
FIG. 8 is a rear view of an open configuration of an exemplary multi-purpose storage container having a lined shell, according to embodiments of the disclosure.

FIGS. 1-8 illustrate different configurations of a multi-purpose storage container 100. FIGS. 1-3 illustrate open configurations of two embodiments of the multi-purpose storage container 100. When in the open configurations shown in FIGS. 1-3, the multi-purpose storage container may be used as a tent or temporary storage container. FIG. 4. illustrates a closed configuration of the multi-purpose storage container 100. FIGS. 5-6 illustrate an open configuration of the multi-purpose storage container mounted to a vehicle. FIG. 7 illustrates a closed configuration of the multi-purpose storage container mounted to a vehicle. FIG. 8 illustrates an open configuration of the multi-purpose storage container having a lined shell.

As shown in FIGS. 1-3, when in the open configuration, the multi-purpose storage container 100 may be used as a tent or other shelter for one or more persons and or objects. The multi-purpose storage container 100 may be used as a stand-alone structure as shown in FIGS. 1-4 or mounted to a vehicle as shown in FIGS. 5-7. When in the closed configuration shown in FIG. 4, the multi-purpose storage container 100 may be transported and or mounted to an automobile or other structure and used as a cargo box for expanding the cargo space of the vehicle. The interior of the multi-purpose storage container 100 provides space, even in the closed configuration, for storing one or more objects. Once mounted to a vehicle, the multi-purpose storage container 100 may converted from a closed configuration (as shown in FIG. 7) to an open configuration (as shown in FIGS. 5-6) and used as a pop-up tent that transforms the vehicle into a camper with additional living space. When the pop-up tent is no longer needed, the multi-purpose storage container 100 may be transformed from the open configuration back to the closed configuration and used as a cargo box. The multi-purpose storage container 100 may be converted from an open configuration to a closed configuration easily while mounted to the vehicle.

To change the configuration of the multi-purpose storage container 100 from a closed configuration to an open configuration, one or more locks 140 securing and holding the platform 102 and shell 104 together may be unlocked. As shown in FIG. 4, the locks 140 may be positioned along the perimeter of the multi-purpose storage container 100. For example, the locks 140 may include bolts (e.g., eye bolts) secured to the platform 102. The bolts may be inserted into holes drilled into the perimeter of the shell 104 when the shell 104 is closed over the platform 102. The locks 140 may also include clips, combination locks, pad locks, and or other locking mechanisms that may be fixed to the loop of the eye bolt to secure the bolts inside the holes in the shell 104 and prevent the multi-purpose storage container 100 from being opened. These features can be combined with any of the other features disclosed herein in any combination or permutation.

To open the multi-purpose storage container 100, the locking mechanisms may be removed from the bolts. The multi-purpose storage container 100 may then be opened by pushing up on the shell 104. A gas prop shock or other pneumatic strut may be used to help lift the shell and reduce the force required to open the multi-purpose storage container. The shell 104 may be extended until it is rotated approximately 45° or more above the platform 102. Once the shell 104 is extended, the gas prop strut or other extension rod 112 may hold the shell in place above the platform 102. In other arrangements of the closed configuration, the shell 104 may be secured over the platform 102 using wing nuts that are attached to eyebolts in each of the 4 corners of the platform. To open these embodiments of the multi-purpose storage container 100, the wing nuts on the back two corners of the platform are unscrewed and a threaded eyebolt secured using the wing nut is pushed through holes on the back two corners of the shell 104. The shell 104 in these configurations is lifted above the platform 102. A metal rod may extend through the eyebolts on the front corners of the platform 102 to secure the shell 104 over the platform 102 in this portion of the multi-purpose storage container 100.

FIG. 1 illustrates a side elevational view of an open configuration of the multi-purpose storage container 100. As shown, the multi-purpose storage container 100 includes a platform 102, a shell 104, and a lining 106. The platform 102 may be attached to the shell 104 by a hinge joint 124 at the front end 130 of the platform 102. The platform 102 may have a length measuring between 40 in (inches) and 100 in and a width measuring between 20 in and 60 in. For example, the platform 102 may have a length of 86 in and a width of 42 in. In other embodiments, the platform 102 may have a length of 86 in and a width of 44 in. In an open configuration, the shell 104 may have a height measuring between 20 in and 80 in. In a closed configuration the shell may have a height measuring between 5 in and 20 in. The shell 104 may have a width measuring between 20 in and 60 in, and a length measuring between 40 in and 100 in. For example, the shell 104 may have a width of 42 in and a length of 86 in. The shell 104 may have a height of 14 in when closed and 60 in when open. In other embodiments, the shell 104 may have a length of 86 in and a width of 44 in. The shell may have a height of 16 in when closed and a height of 65 in when open.

The multi-purpose storage container 100 may be constructed from lightweight materials and may weigh between 10 and 60 pounds (lbs.) For example, the multi-purpose storage container 100 may weigh 39 lbs. The platform 102 may be made of any durable material including wood (e.g., marine grade plywood), polyethylene and or other plastics, carbon fiber, fiber glass, and or aluminum and or other metals. The shell 104 may be made of any durable light weight material including aluminum and or other metals, polyethylene and or other plastics (e.g., high density polyethylene (HDPE)), carbon fiber, fiber glass, and or fabric and or other woven materials. The platform 102 and or the shell 104 may be made of recycled materials. The lining 106 may be a fabric or other woven material (e.g., coated tarpaulin canvas, waterproof oxford custom tailored fabric with PVC backing, and the like).

The perimeter of the shell 104 may include a track 114 that fits within a groove 110 when the multi-purpose storage container 100 is in a closed configuration shown below in FIG. 4. The track 114 may be a reinforced tubing that runs along the perimeter of the multi-purpose storage container 100. The track 114 may seal the inside of the multi-purpose storage container 100 when in a closed configuration. The track 114 may sit within the groove 100 so that the bottom edge of the shell 104 is flush against the floor of the platform 102. The groove 110 may be located in a gap between the side edge 134 of the platform 102 and a raised panel 120 of the platform 102. The raised panel 120 may extend along both sides of the platform 102 between the front end 130 of the platform 102 and the rear end 132 of the platform 102. As shown in FIG. 1, the gap between the track 114 and the raised panel 120 may be used as an additional storage compartment for storing tools 122 or other objects. The gap between the track 114 and the raised panel 120 may also store an extension rod 112 (e.g., a threaded steel rod, a pneumatic gas strut, and the like) that supports the shell 104 when the multi-purpose storage container 100 is in an open configuration. These features can be combined with any of the other features disclosed herein in any combination or permutation.

As shown in FIG. 3, to facilitate storing objects inside the gap 262 between the track 114 and the raised panel 120, one or more magnets 252 may be positioned within the gap 262. The magnets 252 may be embedded into the surface of the portion of the platform 102 that extends from the outer edge of the raised panel 120 to the edge of the platform 102. One or more objects (e.g., the flashlight 260 shown in FIG. 3) may be secured to platform 102 using the magnets 252. The magnets 252 may secure the objects inside the gap 262 when the multi-purpose storage container 100 is in an open configuration and or a closed configuration. The magnets 252 may hold the objects in place inside the gap 262 and prevent the objects from falling into the groove 110 that holds the track 114. These features can be combined with any of the other features disclosed herein in any combination or permutation.

The track 114 may be between 40 in and 100 in long and be may be a structural component of the multi-purpose storage container 100. For example, the track 114 may be 86 in long and may be a gunwale part of a boat hull. The track 114 may include clamped on foam portions that seal the inside of the multi-purpose storage container 100 when in a closed configuration. The track 114 may include one or more wheels 116 at the rear end 136 of the shell 104. For example, the one or more wheels 116 may be positioned at the rear portion of the track at each of the two sides of the multi-purpose storage container 100. The wheels 116 may also be positioned at any point along the track 114. The wheels 116 may be removably attached to the track 114 using a clamp and or a wing nut threaded over a threaded axel (e.g., a steel bolt) that runs through the exterior wall of the shell 104. The wheels 116 may facilitate transport of the multi-purpose storage container 100 by allowing the multi-purpose storage container 100 to be rolled from one location to another using the wheels 116 as shown in FIG. 3. The wheels 116 may be aluminum wheels having a circumference between 50 millimeters (mm) and 500 mm. The wheels 116 may be light weight and may have a slick rolling resistance. The wheels 116 may also include terrain specific treads to facilitate passage over any terrain. The wheels 116 may also include bearings that can withstand over 300 lbs.

The shell 104 may include a handle at the front end 138 of the shell 104. To transport the multi-purpose storage container 100, the handle may be used to lift the front end 138 of the shell 104 and the front end 130 of the platform 102 above the ground so that the wheels 116 are the only portion of the multi-purpose storage container 100 in contact with the ground. The handle may be between 4 in and 10 in wide and may be made out of metal (e.g., aluminum, antibacterial brass, and the like), wood, carbon fiber, and or other durable materials. To increase comfort, the handle may be wrapped with leather and or fabric. As shown in FIG. 3, the multi-purpose storage container 100 may also include a harness 250. The harness 250 may include a strong, durable cord and or rope wound from polymer and or cloth treads. The harness 250 may be secured to the shell 104. For example, the harness 250 may be threaded through the track 114 along the sides of the shell 104 so that the harness 250 extends along the entire distance from the back to the front of the shell 104 and can be used to pull the multi-purpose storage container 100 from the front and or the back. The position of the harness 250 within the track 114 also enables the harness 250 to be used to pull the shell 104 when the shell 104 is inverted (i.e., in a boat and or sled configuration). These features can be combined with any of the other features disclosed herein in any combination or permutation.

In the open configuration of the multi-purpose storage container 100 shown in FIGS. 1-3, the shell 104 is positioned above the platform 102. For example, to form the open configuration, the shell 104 is rotated over the platform 102 using the hinge joint 124 so that the bottom edge 140 of the shell 104 has an angle of up to seventy degrees with respect to the side edge 134 of the platform 102. The hinge joint 124 may be made from stainless steel and may enable the shell 104 to rotate up to 180° relative to the platform 102. The hinge joint 124 may be secured to the platform 102 using a wing nut and bolt. The hinge joint 124 may also have a quick release mechanism that allows the shell 104 to be detached from the platform 102 quickly.

The multi-purpose storage container 100 may have an extension rod 112 on one or more sides to hold the shell 104 above the platform 102 when the multi-purpose storage container 100 is in the open configuration. For example, the extension rod 112 may be a pneumatic gas strut with 80 lbs×2 support force that is fixed and or adjustable. The extension rod 112 may also be a threaded steel rod. The extension rod 112 may be secured to the shell 104 using any attachment mechanism (e.g., a wing nut and bolt threaded through the exterior wall of the shell 104). The extension rod 112 may extend between the shell 104 and the platform 102. For example, the extension rod 112 may extend from the track 114 along the perimeter of the shell 104 to floor of the platform 102. To position, the multi-purpose storage container 100 in an open configuration, the shell 104 may be extended above the platform 102 by rotating the shell 104 along the hinge joint 124. Once the shell 104 is extended above the platform 102, the extension rod 112 may be positioned between the shell 104 and the platform 102 to support the shell 104. The extension rod 112 may lock when fully extended and or when fully compressed. The extension rod 112 may also lock at a variety of positions between fully extended and fully compressed to support the shell 104 at a variety of positions and provide multiple open configurations. For example, the threaded steel extension rod 112 may be adjusted by, for example, turning the extension rod 112 clockwise to the right to extend the length of the extension rod 112 and increase the interior height of the multi-purpose storage container 100 and counterclockwise to the left to compress the length of the extension rod 112 and reduce the interior height of the multipurpose storage container 100. These features can be combined with any of the other features disclosed herein in any combination or permutation.

When the multi-purpose storage container is in an open configuration, the liner 106 may form the side walls of the temporary shelter provided by the multi-purpose storage container 100. The top edge 126 of the liner 106 may be removably attached to the shell 104 and the bottom edge 128 of the liner 106 may be fixed to the platform 102 so that the liner 106 unfolds as the shell 104 is extended over the platform 102. As shown in FIG. 3, the liner 106 may be fixed to the shell 104 using a U shaped rubber edge trim that compresses the liner 106 against the walls of the shell 104. The liner 106 may be secured to the platform 102 using one or more magnets 252 (e.g., an 88 pound (lb.) power magnet) that may hold metal washers on the bottom on the liner 106 in place inside the groove 110 and or the gap 262 in the platform 102. Additionally, the liner 106 may be fixed to the interior sides of the shell 104 and or platform 102 using Velcro. Bungee cords 254 may be used to secure the liner 106 inside the multi-purpose storage container 100 when in a closed configuration. The bungee cords 254 may also help shape the liner 106 when the multi-purpose storage container 100 is in an open configuration. For example, the bungee cords 254 may extend from the track 114 to the platform 102 along the entire opening covered by the liner 106. The bungee cords 254 may serve as a guide that keeps the liner 106 inside the multi-purpose storage container 100. The bungee cords 254 provide a structure to the liner that enables the inside of the multi-purpose storage container 100 to be enclosed by liner 106 during all weather conditions including wind, rain, and snow. These features can be combined with any of the other features disclosed herein in any combination or permutation.

Once unfolded, the liner 106 may provide the side walls of the shelter configuration of the multi-purpose storage container 100. The interior of the shelter configuration of the multi-purpose storage container 100 may be enclosed on three or more sides. Similar to a tent, the shelter configuration may have an opening 108 on the front side of the multi-purpose storage container 100. The opening 108 may be left uncovered or may have a door 202 or other covering as shown in FIG. 2. To cover the opening 108, a piece of the liner 106 may be secured over the opening 108 using Velcro. When the multi-purpose storage container 100 is in an open configuration with the shell 104 fully extended over the platform, the height of the opening 108 may be 60 in.

FIG. 2 illustrates the shelter configuration formed by arranging the multi-purpose storage container 100 in an open configuration. The shelter configuration includes a door 202 that extends over the opening 108 in the shelter. The door 202 may be made out of a fabric or other woven material (e.g., waterproof canvas). The door 202 may shade the opening 108 and or may be folded down over the opening 108 to cover the opening 108 and enclose the shelter on all four sides. The door 202 may include a curtain 206 that is removably attached to a frame 204. The frame 204 may be formed from an extendable portion of the track 114 configured to extend beyond the rear end of the shell. For example, the frame 204 may also be made of reflective fiberglass stakes that retract inside of the track 114 or are removable and may be stored inside the track 114. The frame 204 may be configured to be stored inside the track 114 and may be removed when the door 202 is needed. For example, to form the door 202, the frame 204 may be removed from the interior of the track 114 and extended out over the back side of the multi-purpose storage container 100. The curtain 206 may be fixed to the frame 204 to form an awning that extends over the opening 108. The curtain 206 may be removably fixed to the frame 204 using, for example, Velcro and or magnets. The position of the curtain 206 may be adjusted to increase and or decrease airflow inside the multi-purpose storage container 100. To cover the opening 108, the curtain may be detached from the frame 204 and folded down over the opening 108. Alternatively, the track 114 may include a pivot 208 that allows the frame 204 to rotate down over the opening 108 with the curtain 206 attached. The frame 204 and the pivot 208 create a sturdy door that provides a stronger, more permanent covering for the opening 108 of the shelter. A spring clamp may be used to secure the door 202 over the opening 108 to enclose the interior or the multi-purpose storage container 100. When closed over the opening 108, the door 202 creates a water tight seal. These features can be combined with any of the other features disclosed herein in any combination or permutation.

As shown in FIG. 3, the platform 102 of the multi-purpose storage container 100 may include a plate 256 fixed to the back edge of the platform 102. The plate 256 may be between 6 in and 24 in wide, 10 in to 40 in long, and may be made of a strong durable material, for example, aluminum or other metal. The plate 256 may protect the back edge of the platform 102 to prevent the edge from being scrapped or otherwise damaged. The plate 256 may also protect objects as they are loaded into the multi-purpose storage container 100. For example, the plate 256 may act as a threshold that protects luggage and other objects that may be dragged over the back edge of the platform 102 when loaded into the multi-purpose storage container 100. The shell 104 may also include one or more rubber panels 258 that may be attached to the back of the shell 104. The rubber panels 258 may prevent objects placed on the rubber panels 258 from moving around inside the shell 104 when the shell 104 is invented and used as a boat and or sled. These features can be combined with any of the other features disclosed herein in any combination or permutation.

FIG. 4 illustrates a closed configuration of the multi-purpose storage container 100. When in the closed configuration, the shell 104 may be closed over the platform 102 with the track 114 inserted into the groove 110 around the perimeter of the platform 102. The track 114 may also have a clip 118 that attaches to the platform 102 to secure the track 114 inside the groove and therefore secure the shell 104 over the platform 102. The shell 104 may also be secured to the platform 102 using a wing nut and bolt (e.g., an eyebolt) at each corner of the platform 102. Once attached to the platform 102, the clip 118 may be locked to secure objects inside the multi-purpose storage container 100. In the closed configuration, the liner 106 may be folded inside the multi-purpose storage container 100. Additionally, the multi-purpose storage container 100 in the closed configuration may be transported by rolling the shell 104 and platform 102 on the one or more wheels 116 attached to the rear portion of the track 114.

Vehicle Configurations

As shown in FIGS. 5-7, the multi-purpose storage container 100 may be mounted to an automobile or other vehicle 400. For example, the multi-purpose storage container 100 may be secured to a roof rack on the roof of a car, truck, SUV, or other portion of a vehicle 400. The multi-purpose storage container 100 may also be secured within a cargo bed of a truck as shown in FIGS. 6-7. Objects may then be packed inside the multi-purpose storage container 100 to increase the storage capacity of the vehicle. The size of the multi-purpose storage container 100 may be variable to fit the size of a particular vehicle. For example, longer and shorter multi-purpose storage containers 100 having a length of at least 86 in, a width of at least 43 in, and height of 14 in or less may fit on the top of a large truck, camper, or sport utility vehicle (SUV). Narrower and taller multi-purpose storage containers 100 (e.g., containers having a length of 71 in or less, a width of 44 in or less, and a height of 16 in or more) may fit inside a five foot truck bed of a pickup truck and or SUV.

FIG. 7 illustrates a closed configuration of the multi-purpose storage container 100 mounted inside the bed of a pickup truck. In the closed configuration, the shell 104 is closed over the platform 102 to secure the objects inside the multi-purpose storage container 100 and protect the objects from the weather and other elements of the environment. The vehicle may be driven while the multi-purpose storage container 100 is mounted to the vehicle and or stowed inside the cargo bed so that the objects may be transported inside the multi-purpose storage container 100. The shell 104 may have an aerodynamic shape having an angle of curvature that matches the windshield of a vehicle. For example, the shell 104 may have a front curved side that tracks the curvature of the windshield and improves the aerodynamics of the multi-purpose storage container 100. These features can be combined with any of the other features disclosed herein in any combination or permutation.

FIG. 5 illustrates the multi-purpose storage container 100 mounted to a roof rack 406 on the roof of a vehicle 400. For example, the multi-purpose storage container 100 may be mounted to a roof rack using a galvanized square bolt or u-bolt that attaches to the roof rack and or bed rack of a vehicle. As shown, the multi-purpose storage container 100 may be placed in an open configuration while mounted to the roof rack 406. While in the open configuration, people and or objects may enter the interior of the multi-purpose storage container 100 from inside the vehicle 400. To access the interior of the multi-purpose storage container 100 when the multi-purpose storage container 100 is mounted to a vehicle, a moveable section 404 of the platform 102 may be moved to create an opening in the floor of the platform 102. The opening in the floor of the platform 102 may be aligned with the sunroof 402 of the vehicle so that the opening may be accessed from inside the vehicle 400. Once, the sunroof 402 is open, people and or objects may then enter the interior of the multi-purpose storage container 100 from inside the vehicle 400 via the aligned sunroof 402 and opening. The interior of the multi-purpose storage container 100 may also be accessed from the opening at the rear of the multi-purpose storage container 100. The multi-purpose storage container 100 may be used as a pop-up tent when mounted to a vehicle. For example, people may enter the multi-purpose storage container 100 through moveable section 404 aligned with the sunroof 402 and crawl to the back of the shell 104 to sleep or socialize.

To ensure the movable section 404 aligns with the sunroof 402, the multi-purpose storage container 100 may have markings that indicate the front side of the multi-purpose storage container 100. The movable section 404 may also be a 3 feet (ft) by 3 ft or larger section of the platform 102 so that the opening created by the moveable section 404 can be accessed through any sunroof 402. To restrict access to the inside of the multi-purpose storage container 100 and secure the objects and or people inside the multi-purpose storage container 100, the sunroof 402 may be closed and or the movable section 404 of the platform 102 may be placed over the opening in the floor of the platform 102. These features can be combined with any of the other features disclosed herein in any combination or permutation.

FIGS. 6-7 illustrates the multi-purpose storage container 100 placed inside the cargo bed 502 of a truck 500. As shown in FIG. 7, the multi-purpose storage container 100 may be secured to the cargo bed 502 using galvanized bolts 508 (e.g., eye bolts and or u-bolts with wing nuts) on the four corners of the platform 102. As shown, the multi-purpose storage container 100 may be stowed inside the cargo bed 502 between the rear of the cabin 506 and the tailgate 504.

When arranged in an open configuration, the inside of the multi-purpose storage container 100 may be accessed through the opening 108 at rear of the multi-purpose storage container 100 by opening the tailgate 504. Objects may be secured inside the multi-purpose storage container 100 by arranging the multi-purpose storage container 100 in a closed configuration and closing the tailgate 504. When in a closed configuration, the shell 104 may close over the top of and or below the top of the cargo bed to enclose the multi-purpose storage container 100 on three sides. Closing the tailgate 504 may enclose the multi-purpose storage container 100 on all sides to restrict access to the inside of the multi-purpose storage container 100. These features can be combined with any of the other features disclosed herein in any combination or permutation.

As shown in FIG. 8, the inside of the shell 104 may be lined with a foam insulation 510. For example, the foam insulation 510 may be glued to the inner surface of the shell 104. The foam insulation 510 may enhance the floatation, heat retention, and sound proofing characteristics of the shell 104. The foam insulation 510 may include a foam layer 514 covered with a waterproof carpet 512. Velcro patches may be attached to the outer surface of the waterproof carpet 512 to allow objects to be attached to the foam insulation 510 for storage inside the shell 104. These features can be combined with any of the other features disclosed herein in any combination or permutation.

Detached Platform

Figure 9:
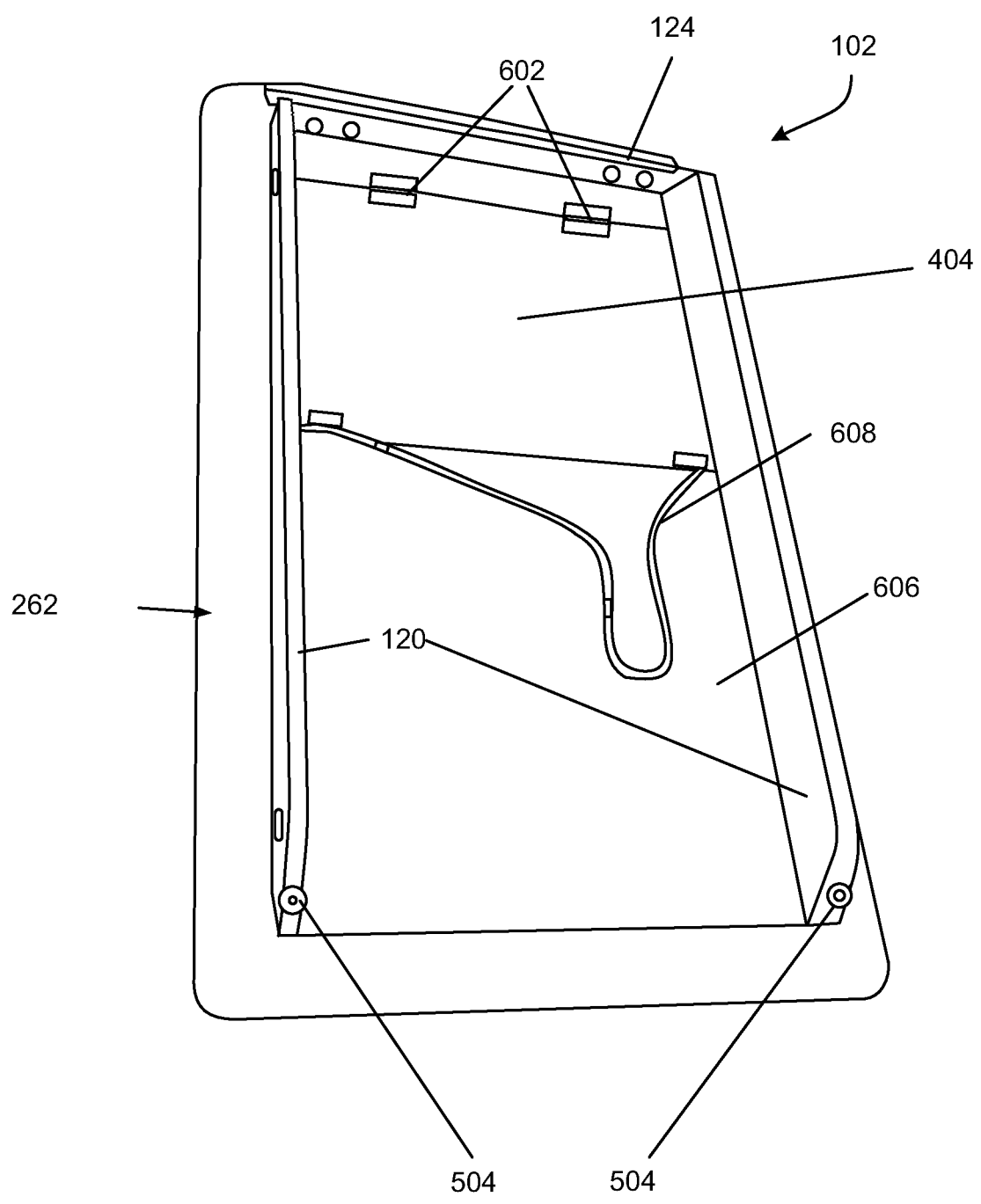
FIG. 9 is an overhead view of an exemplary detached platform of the multi-purpose storage container, according to embodiments of the disclosure.

FIG. 9 illustrates the platform 102 of the multi-purpose storage container 100 after it has been detached from the shell. To facilitate rapid detaching and re-attaching of the shell 104 and the platform 102, quick release hinges may be used for the hinge joint 124 (e.g., 4 in by 2 in stainless steel quick release hinges) and the shell 104 may be attached to the platform 102 using wing nuts and flat head bolts and or screws. As shown, the platform 102 may include a hinge joint 124 at a front end of the platform 102. The front edge of the shell 104 may attach to the hinge joint 124 to secure the shell 104 to the platform 102. The Hinge joint 124 may provide a pivot for extending the side and rear portions of the shell 104 above the floor 606 of the platform 102. These features can be combined with any of the other features disclosed herein in any combination or permutation.

The platform 102 includes two raised panels 120 that run along the sides of the platform 102. The raised panels 120 may be structural component of the platform 102 that reinforces platform 102 to provide additional strength and rigidity. The strength and rigidity provided by the raised panels 120 enables the platform 102 to be used as a ramp and or a emergency crash board with the platform 102 is detached from the shell and inverted. The height of the raised panels 120 may correspond to the height of the side walls of the shell 104 so that the shell 104 may completely cover the raised panels 120 when lowered over the platform 102 to a closed position. The side walls of the shell 104 may extend wider than the raised panels 120 of the platform to create the gap 262 between the outer surface of the raised panels 120 and the inner surface of the side walls of the shell 104 when the multi-purpose storage container 100 is in a closed position. The gap 262 may create an easily accessible storage compartment for storing, for example, tools and other objects needed to attach and or detach the multi-purpose storage container 100 from a vehicle. To secure the shell 104 on top of the platform 102 when the multi-purpose storage container 100 is in a closed configuration, the raised panels 120 may include one or more hooks 604 at the rear of the raised panels 120. The one or more hooks 604 may be configured to receive the clip 118 to hold the closed shell 104 in place over the platform 102.

Figure 10:
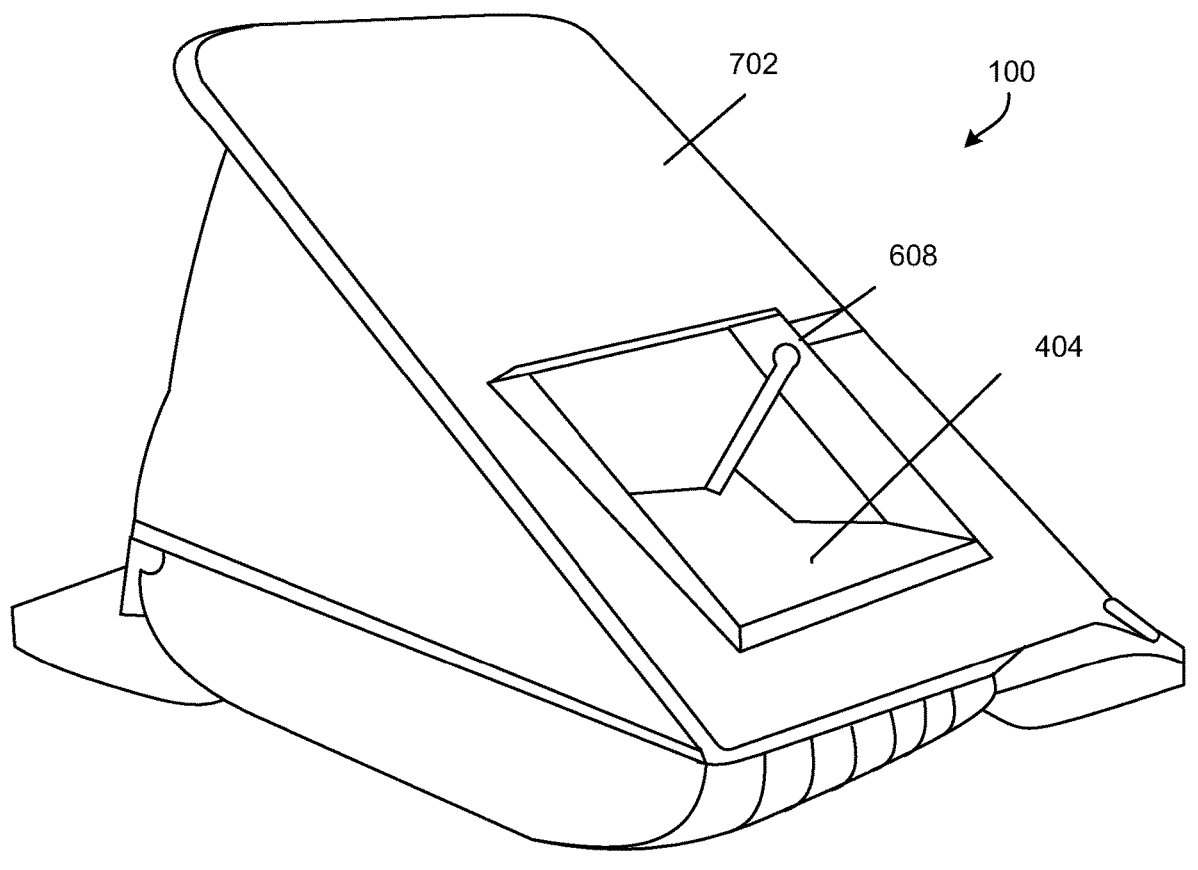
FIG. 10 is a perspective view of an exemplary hinged door included in a platform of the multi-purpose storage container, according to embodiments of the disclosure.

The floor 606 of the platform 102 forms a flat surface that may be used in an emergency situation as a cardio pulmonary resuscitation (CPR) board, back board for spine stabilization, or a transport (i.e., a sled that may transport people and objects during a snowstorm). The floor 606 may include a movable section 404 that may be removed from the floor 606 to provide access to the interior of the multi-purpose storage container 100. The movable section 404 may be attached to the floor 606 using one or more hinges 602 or other joints. The hinges 602 may allow the movable section 404 to rotate in towards the interior of the multi-purpose storage container 100 and or out away from the interior of the multi-purpose storage container 100. A cord 608 and or handle attached to the floor 606 may be used to control the movement of the movable section 404. The cord 608 may also be used to restrict the rotational movement of the movable section 404, for example, by holding the movable section 404 up as shown in FIG. 10 to prevent the movable section 404 from rotating more than 90 degrees. The cord 608 may also hold the movable section 404 in place after the moveable section 404 has been rotated inside the interior of the shell 104. Once supported and secured by the cord 608, the movable section 404 may be used as a table or other flat surface for placing objects. The opening created by rotating the movable section 404 inside the interior of the shell 104 may also be used as a window for people inside the shell 104 to see outside. These features can be combined with any of the other features disclosed herein in any combination or permutation.

FIG. 10 illustrates, the multi-purpose storage container 100 in an open configuration with the shell and platform 102 inverted so that the platform 102 extends over the shell. As shown, the movable section 404 of the floor of the platform 102 is rotated 90 degrees toward the interior of the multi-purpose storage container 100 to create an open space to insert and or remove objects from the multi-purpose storage container 100. The cord 608 is fully extended to hold up the movable section 404 and prevent the movable section 404 from rotating further into the interior of the multi-purpose storage container 100. By limiting the rotational movement of the movable section to 90 degrees, the cord 608 prevents to movable section 404 from collapsing too far inside the multi-purpose storage container 100 and ensures the movable section 404 may be moved easily. The exterior surface 702 of the platform 102 may be surfaced with a blackboard or other texture to allow messages to be written on the outside of the multi-purpose storage container 100. These features can be combined with any of the other features disclosed herein in any combination or permutation.

Detached Shell

Figure 11:
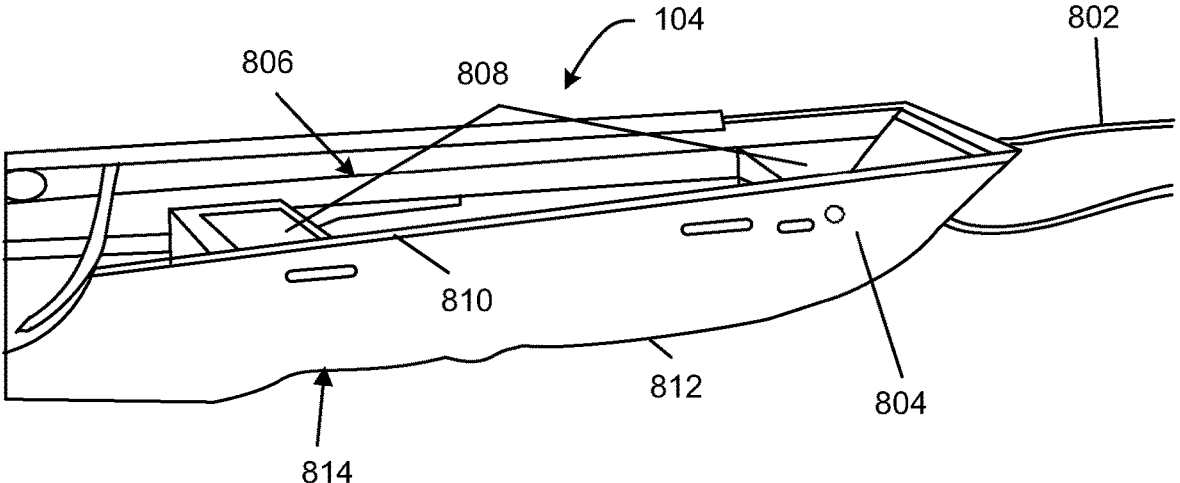
FIG. 11 is a perspective view of an exemplary detached, inverted shell of the multi-purpose storage container, according to embodiments of the disclosure.
Figure 12:
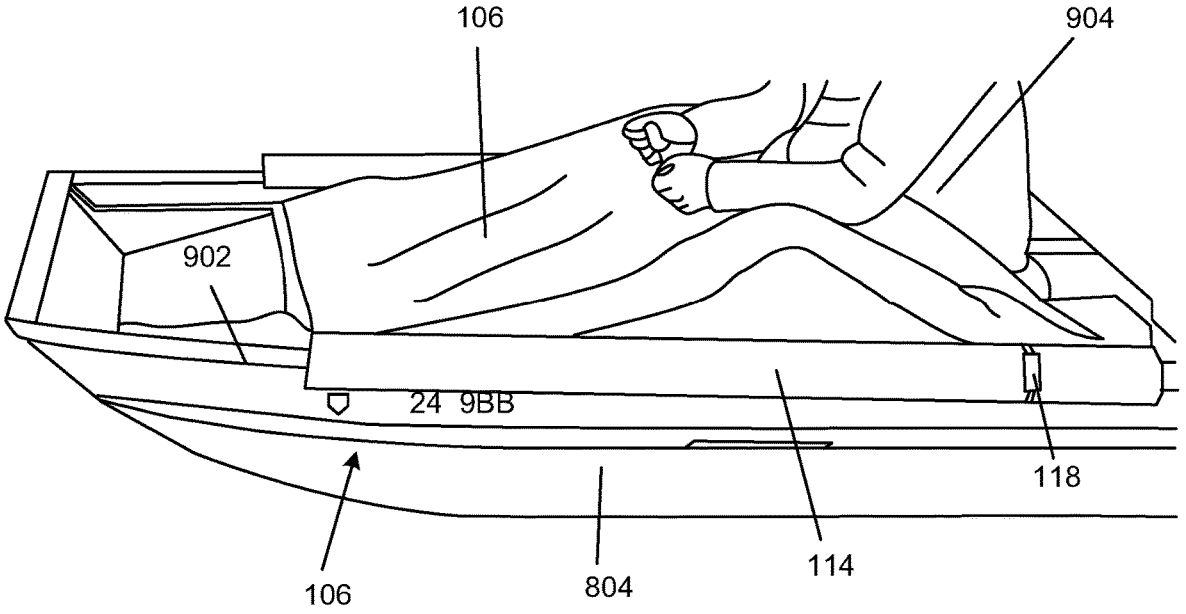
FIG. 12 is a perspective view of an alternate configuration of the detached, inverted shell of the multi-purpose storage container, according to embodiments of the disclosure.
Figure 13:
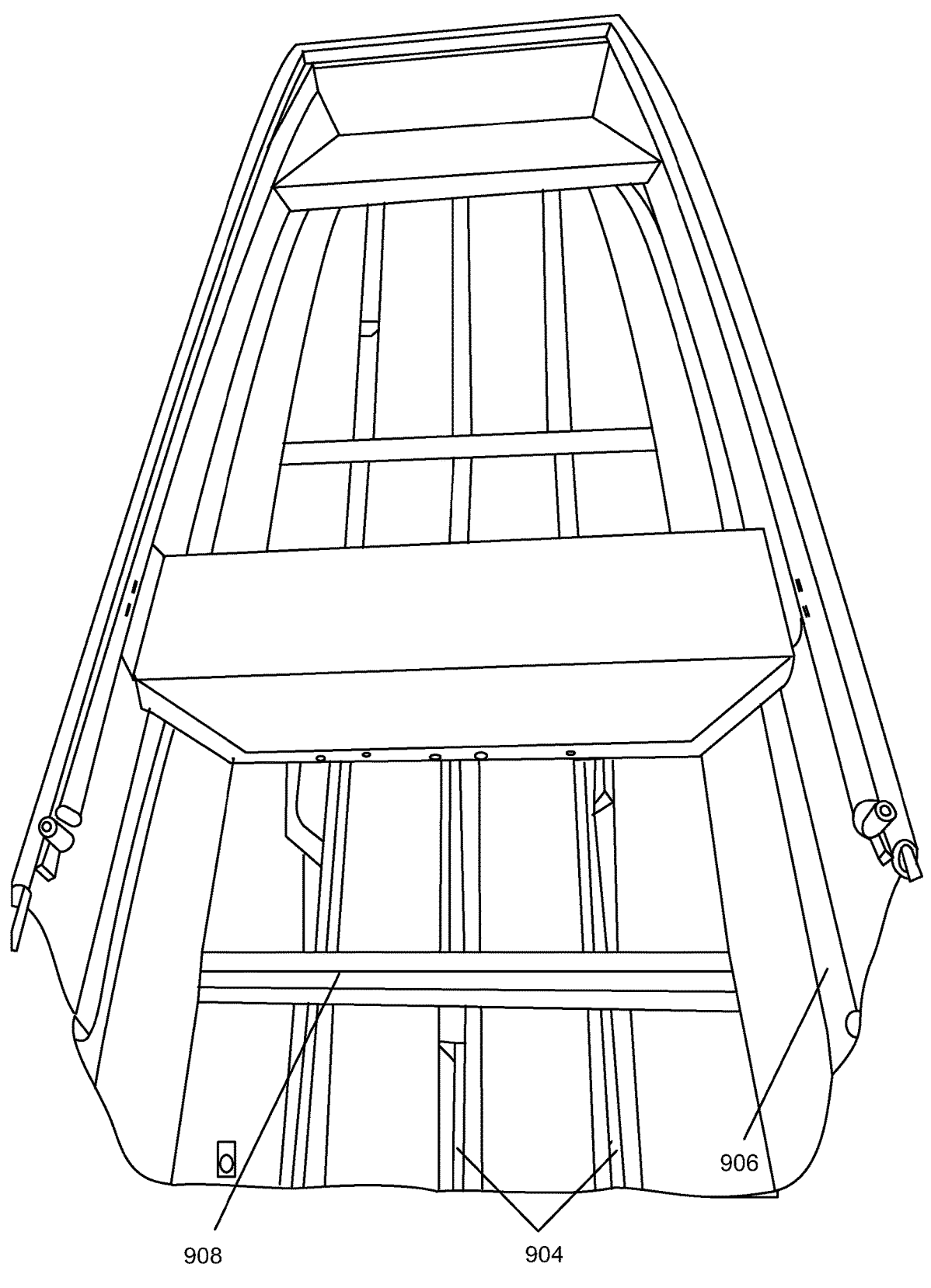
FIG. 13 is an overhead view of an exemplary detached, inverted shell of the multi-purpose storage container, according to embodiments of the disclosure.

FIGS. 11-13 illustrate, the shell 104 after it has been detached from the platform 102. FIG. 11 illustrates a sled configuration of the shell 104 and FIGS. 12-13 illustrate a boat configuration of the shell 104. The multi-purpose storage container 100 may be arranged to form the sled and boat configurations by detaching the shell 104 from the platform and flipping the shell 104 top side down to invert the shell 104 so that the closed top 814 of the shell 104 is in contact with the ground. To increase the strength of the boat hull and or sled, oak and or copper floor runners 904 and side runners 906 may be included inside the shell 104. The floor 904 and side runners 906 increase the strength and rigidity of the shell 104 while also helping the shell 104 glide on air, water, snow and other surface. One or more cross plates 908 may also be attached to the floor of the shell 104 to add additional strength and aridity of the shell 104 when used as a boat hull and or sled. These features can be combined with any of the other features disclosed herein in any combination or permutation.

As shown in FIG. 11, the shell may have four side walls 804 (i.e., a front wall, a rear wall, a right side wall, and a left side wall) that enable the shell 104 to be used as a hull for a sled and or boat. The side walls 804 may slope inwardly from the top edge 810 of the inverted shell 104 to the bottom edge 812 of the inverted shell 104 to enable to shell 104 to cut through snow when used as a sled and or waves or choppy water when used as a boat. The interior 806 of the shell 104 may be mostly hollow to allow cargo to be stored inside the shell 104. The shell 104 may have two elevated boards 808 within the interior 806 of the shell 104. The elevated boards 808 may be used as seats for people to sit on when traveling inside the sled and or boat configuration of the shell 104. A rope 802 or cord may be attached to the front to the shell 104 to attach the shell 104 to vehicle or domesticated animal (e.g., horse, donkey, mule, dog, and the like). The sled configuration may then be pulled using the rope 802 to transport people and or cargo contained within the interior 806 of the shell 104. These features can be combined with any of the other features disclosed herein in any combination or permutation.

FIGS. 12-13 illustrates a boat configuration of the shell 104. As shown, the side walls of the shell may be curved and sloped from top to bottom over the inverted shell 104 to allow the shell 104 to float and move easier through water. LED lights may be attached to the shell 104 to enhance visibility of the boat configurations. The shell 104 may also include permanent and or removable boat features (e.g., a keel, oar locks, motor mount, ballast, and the like). The liner 106 may be folded over the interior of the shell 104 to provide a waterproof barrier for the cargo inside the shell 104. The liner 106 may also provide a sun blocking cover and or heat retention mechanism. The liner 106 enables the shell 104 to be used as a kayak or canoe without getting water on the cargo inside the shell 104 during paddling. To hold the liner 106 in place over the interior of the shell, the clip 118 may compress the liner 106 against the track 114. The liner 106 may also be arranged to pass between the track and the top edge 902 of the side walls 804 to that the perimeter of the liner 106 is secured to the side walls 804 of the shell. A person 904 may pilot the boat configuration of the shell 104 by sitting on one of the raised boards and propelling the boat configuration forward within one or more paddles or by controlling a motor mounted to the rear of the shell 104. These features can be combined with any of the other features disclosed herein in any combination or permutation.

CONCLUSION

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings including combinations and sub combinations. The embodiments were chosen and described in order to best explain the principles of the invention and its practical applications, to thereby enable others skilled in the art to best utilize the invention and various embodiments with various modifications as are suited to the particular use contemplated. Each embodiment includes several features. These features can be combined with any of the other features disclosed herein in any combination or permutation. Therefore, the invention may include any of the disclosed features in any combination and does not require all of the features of any one embodiment.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more targets, that word covers all of the following interpretations of the word: any of the targets in the list, all of the targets in the list and any combination of the targets in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multi-purpose storage container comprising:
a platform including two raised panels and a movable section cut into the platform, wherein the movable section is fixed to the platform using one or more hinges and each of the two raised panels runs along a side of the platform between a front end of the platform and a rear end of the platform, the platform configured to mount to a vehicle roof rack;
a shell attached to the platform at a hinge joint positioned at the front end of the platform, the shell configured to rotate along the hinge joint, wherein the shell configured to float on water;
a liner including a top edge removably attached to the shell and a bottom edge removably attached to the platform, the liner configured to unfold to form two side walls that extend between the shell and the platform when the shell is rotated above the platform;
a track that forms a perimeter of the shell; and
a groove cut into a gap on each side of the platform, wherein the gap is formed between a side edge of the platform and the raised panel, wherein the track is configured to fit inside the groove when the shell is closed over the platform.

2. The multi-purpose storage container of claim 1, wherein the track includes one or more wheels positioned at a rear end of the shell; and
wherein the front end of shell includes a handle configured to allow the front end of the shell and the front end of the platform to be lifted off of the ground so that the multi-purpose storage container can roll on the one or more wheels.

3. The multi-purpose storage container of claim 1, wherein the track includes a clip positioned at each side of the shell; and wherein the two raised panels each include a hook at the rear end of the platform, the hook configured to receive the clip to secure the shell to the platform.

4. The multi-purpose storage container of claim 1, wherein the shell is configured to rotate along the hinged joint to from a closed configuration of the multi-purpose storage container and an open configuration of the multi-purpose storage container.

5. The multi-purpose storage container of claim 4, wherein a bottom edge of the shell is flush against a floor of the platform when the multi-purpose storage container is in the closed configuration.

6. The multi-purpose storage container of claim 4, wherein the shell is rotated above the platform so that a bottom edge of the shell forms an angle of up to seventy degrees relative to a floor of the platform when the multi-purpose container is in the open configuration.

7. The multi-purpose storage container of claim 4, wherein rotating the shell above the platform to arrange the multi-purpose storage container in the open configuration creates an opening at the rear end of the platform, wherein an interior of the multi-purpose storage container may be accessed through the opening.

8. The multi-purpose storage container of claim 7, further comprising a door configured to cover the opening, wherein the door comprises a frame that extends beyond the rear end of the shell and a curtain attached to the frame, the door configured to cover the opening by rotating down over the opening via a pivot.

9. The multi-purpose storage container of claim 1, further comprising an extension rod fixed to the platform and the shell, wherein the extension rod extends between the shell and the platform to support the shell when the shell is rotated above the platform.

10. The multi-purpose storage container of claim 1, wherein the shell is configured to be detached from the platform and inverted so that a closed top of the shell is in contact with the ground to allow cargo to be placed in an interior of the shell;

the shell includes a raised board that forms a seat to transport a person inside the shell when the shell is inverted; and wherein the shell includes two side walls, a front wall, and a rear wall, that are configured to form at least one of a sled or a hull of a boat when the shell is inverted.

11. The multi-purpose storage container of claim 10, wherein the two side walls slope inwardly from the top edge of the inverted shell to the bottom edge of the inverted shell.

12. The multi-purpose storage container of claim 1, wherein the multi-purpose storage container is configured to be mounted to the roof rack of a vehicle by attaching the platform to the roof rack with the movable section aligned with a sunroof of the vehicle.

13. The multi-purpose storage container of claim 1, wherein the platform includes a cord attached to the movable section, wherein the cord is configured to support the movable section when the movable section is rotated away from the platform.

* * * * *